United States Patent
De Gaudemaris et al.

(10) Patent No.: US 11,365,308 B2
(45) Date of Patent: Jun. 21, 2022

(54) RUBBER COMPOSITION INCLUDING A SPECIFIC HYDROCARBON RESIN

(71) Applicant: COMPAGNIE GENERALE DES ETABLISSEMENTS MICHELIN, Clermont-Ferrand (FR)

(72) Inventors: Benoit De Gaudemaris, Clermont-Ferrand (FR); Alain Hut, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 248 days.

(21) Appl. No.: 15/768,114

(22) PCT Filed: Oct. 14, 2016

(86) PCT No.: PCT/EP2016/074669
§ 371 (c)(1),
(2) Date: Apr. 13, 2018

(87) PCT Pub. No.: WO2017/064235
PCT Pub. Date: Apr. 20, 2017

(65) Prior Publication Data
US 2018/0340055 A1 Nov. 29, 2018

(30) Foreign Application Priority Data
Oct. 16, 2015 (FR) ...................... 1559874

(51) Int. Cl.
C08L 9/00 (2006.01)
B60C 1/00 (2006.01)
C08L 21/00 (2006.01)
C08L 45/00 (2006.01)
C08K 3/013 (2018.01)

(52) U.S. Cl.
CPC .............. C08L 9/00 (2013.01); B60C 1/0016 (2013.01); C08K 3/013 (2018.01); C08L 21/00 (2013.01); C08L 45/00 (2013.01)

(58) Field of Classification Search
CPC . C08L 9/00; C08L 21/00; C08L 45/00; B60C 1/0016; C08K 3/013
See application file for complete search history.

(56) References Cited

U.S. PATENT DOCUMENTS

| | | |
|---|---|---|
| 5,227,425 A | 7/1993 | Rauline |
| 5,852,099 A | 12/1998 | Vanel |
| 5,900,449 A | 5/1999 | Custodero et al. |
| 6,420,488 B1 | 7/2002 | Penot |
| 6,536,492 B2 | 3/2003 | Vasseur |
| 6,774,255 B1 | 8/2004 | Tardivat et al. |
| 7,217,751 B2 | 5/2007 | Durel et al. |
| 7,250,463 B2 | 7/2007 | Durel et al. |
| 7,300,970 B2 | 11/2007 | Durel et al. |
| 7,488,768 B2 | 2/2009 | Tardivat et al. |
| 7,491,767 B2 | 2/2009 | Durel et al. |
| 7,820,771 B2 | 10/2010 | Lapra et al. |
| 8,461,269 B2 | 6/2013 | Varagniat et al. |
| 8,492,475 B2 | 7/2013 | Araujo Da Silva et al. |
| 8,883,929 B2 | 11/2014 | Gandon-Pain et al. |
| 9,522,571 B2 | 12/2016 | Darnaud et al. |
| 9,856,368 B2 | 1/2018 | Herzog et al. |
| 2001/0034389 A1 | 10/2001 | Vasseur |
| 2004/0051210 A1 | 3/2004 | Tardivat et al. |
| 2004/0132880 A1 | 7/2004 | Durel et al. |
| 2005/0004297 A1 | 1/2005 | Durel et al. |
| 2005/0016650 A1 | 1/2005 | Durel et al. |
| 2005/0016651 A1 | 1/2005 | Durel et al. |
| 2008/0132644 A1 | 6/2008 | Lapra et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-pain et al. |
| 2010/0022714 A1 | 1/2010 | Varagniat et al. |
| 2011/0021702 A1 | 1/2011 | Gandon-Pain et al. |
| 2011/0152458 A1 | 6/2011 | Araujo Da Silva et al. |
| 2012/0208948 A1 | 8/2012 | Gandon-Pain et al. |
| 2013/0202829 A1* | 8/2013 | Voge ...................... B29C 48/21 428/36.8 |
| 2013/0211027 A1 | 8/2013 | Barbee et al. |
| 2014/0155521 A1* | 6/2014 | Miyazaki ................ C08L 91/06 523/156 |

(Continued)

FOREIGN PATENT DOCUMENTS

| EP | 0501227 A1 | 9/1992 |
|---|---|---|
| EP | 0735088 A1 | 10/1996 |

(Continued)

*Primary Examiner* — Andrew J. Oyer
(74) *Attorney, Agent, or Firm* — Venable LLP

(57) ABSTRACT

A rubber composition is based on at least one elastomer, a reinforcing filler, a crosslinking system and an optionally hydrogenated hydrocarbon-based resin, predominantly composed of units selected from the group consisting of cyclopentadiene, dicyclopentadiene, methylcyclopentadiene and mixtures thereof, said hydrocarbon-based resin having an average molecular weight Mz of less than 2000 g/mol and a glass transition temperature Tg, expressed in ° C., such that: Tg≥80−2*(% HA), wherein % HA represents the content of aromatic protons of said resin, the content of said hydrocarbon-based resin being within a range extending from 15 to 150 phr.

29 Claims, No Drawings

(56) References Cited

U.S. PATENT DOCUMENTS

| | | | |
|---|---|---|---|
| 2015/0065655 A1* | 3/2015 | Blok | B60C 1/0016 525/211 |
| 2015/0306912 A1 | 10/2015 | Darnaud et al. | |
| 2016/0194485 A1 | 7/2016 | Herzog et al. | |
| 2016/0319116 A1 | 11/2016 | Labrunie et al. | |
| 2017/0204256 A1 | 7/2017 | Labrunie et al. | |
| 2017/0204257 A1 | 7/2017 | Labrunie et al. | |
| 2018/0001702 A1 | 1/2018 | Chatard et al. | |

FOREIGN PATENT DOCUMENTS

| | | |
|---|---|---|
| EP | 0810258 A1 | 12/1997 |
| JP | 2009-138025 A | 6/2009 |
| JP | 2011-88998 A | 5/2011 |
| WO | 97/36724 A2 | 10/1997 |
| WO | 99/16600 A1 | 4/1999 |
| WO | 00/05300 A1 | 2/2000 |
| WO | 00/05301 A1 | 2/2000 |
| WO | 02/30939 A1 | 4/2002 |
| WO | 02/31041 A1 | 4/2002 |
| WO | 02/083782 A1 | 10/2002 |
| WO | 03/002648 A1 | 1/2003 |
| WO | 03/002649 A1 | 1/2003 |
| WO | 03/016387 A1 | 2/2003 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2008/003434 A1 | 1/2008 |
| WO | 2008/003435 A1 | 1/2008 |
| WO | 2013092528 A1 | 6/2013 |
| WO | 2013176712 A1 | 11/2013 |
| WO | 2015/043902 A1 | 4/2015 |

* cited by examiner

RUBBER COMPOSITION INCLUDING A SPECIFIC HYDROCARBON RESIN

FIELD OF THE INVENTION

The invention relates to compositions, especially for tyres, and more particularly to compositions comprising a specific hydrocarbon-based resin to improve the compatibility of the resin with elastomers, in particular with elastomers having a very low glass transition temperature (Tg).

RELATED ART

It is known from the prior art that elastomers having a low Tg enable an improvement in terms of abrasion performance (WO 2015/043902). However, these low Tg elastomers have poor compatibility with the hydrocarbon-based plasticizing to resins usually used in tyres, which does not make it possible to use them easily and optimally in compositions for tyres which may have the best compromise between performance properties that are difficult to reconcile simultaneously, namely wear resistance and grip, which must be high, and rolling resistance, which must be low in order to minimize fuel consumption.

Thus, it is currently beneficial for tyre manufacturers to find formulas which make it possible to improve the balance between all these performance properties, especially by improving the compatibility of the elastomers with the hydrocarbon-based plasticizing resins.

Document WO2013/176712 describes various resins of cyclopentadiene/dicyclopentadiene/methylcyclopentadiene type, having specific weights and softening points. In this document, these resins are used at a content of 12 phr in the examples to improve wet grip.

At present, the Applicants have shown that a particular composition comprising a specific hydrocarbon-based resin makes it possible to obtain compositions having high grip and low rolling resistance.

SUMMARY OF THE INVENTION

The invention therefore relates to a rubber composition based on at least one elastomer, a reinforcing filler, a crosslinking system and an optionally hydrogenated hydrocarbon-based resin, predominantly composed of units selected from the group consisting of cyclopentadiene, dicyclopentadiene, methylcyclopentadiene and mixtures thereof, said hydrocarbon-based resin having an average molecular weight Mz of less than 2000 g/mol and a glass transition temperature Tg, expressed in ° C., such that:

$Tg \geq 80 - 2*(\% \ HA)$ wherein % HA represents the content of aromatic protons of said resin, the content of said hydrocarbon-based resin is within a range extending from 15 to 150 phr.

The invention preferably relates to a composition as defined above, wherein said hydrocarbon-based resin has an Mz of less than 1500 g/mol. Preferably, said hydrocarbon-based resin has a glass transition temperature Tg, expressed in ° C., such that $Tg \geq 85 - 2*(\% \ HA)$. More preferably still, said hydrocarbon-based resin has a polydispersity index (PI) of less than 1.7, preferably less than 1.6. Preferentially, the resin has a content of aromatic protons of less than 50%, preferentially within a range extending from 0% to 20%, preferably from 0% to 15%. According to a preferential mode, the resin has a content of aromatic protons of less than 5%, preferably within a range extending from 0% to 4%, preferably from 0% to 2%, and more preferentially of 0%. According to another preferential mode, the resin has a content of aromatic protons within a range extending from 3% to 15%, preferably from 5% to 10%. Also preferably, the resin has a content of ethylenic protons of less than 0.5%, preferably less than 0.1%. More preferentially, the resin does not comprise any ethylenic units.

Preferentially, the invention relates to a composition as defined above, wherein the elastomer predominantly comprises an elastomer having a glass transition temperature Tg of less than −70° C., preferably of between −70° C. and −110° C., more preferentially between −80° C. and −110° C., and more preferentially still between −90° C. and −110° C. Preferably, the elastomer predominantly comprises an elastomer is selected from the group consisting of essentially unsaturated diene elastomers, preferentially selected from the group consisting of polybutadienes, butadiene copolymers and mixtures of these elastomers, and more preferentially from the group consisting of polybutadienes, copolymers of butadiene and styrene, and mixtures of these elastomers.

Preferentially, the invention relates to a composition as defined above, wherein the reinforcing filler is selected from the group consisting of silicas, carbon blacks and the mixtures thereof. Preferably, the content of reinforcing filler is within a range extending from 5 to 200 phr, preferably from 40 to 160 phr. According to a preferred embodiment, the predominant reinforcing filler is silica, preferably at a content within a range extending from 40 to 150 phr. Preferably, according to this preferred embodiment, the composition also comprises a minority amount of carbon black, preferably at a content within a range extending from 0.1 to 10 phr.

Preferably, the invention relates to a composition as defined above, wherein the content of said hydrocarbon-based resin is within a range extending from 25 to 120 phr, preferably from 40 to 115 phr.

The invention also relates to a tyre comprising a composition as defined above, preferably in all or part of the tread thereof.

Preferentially, the tyre according to the invention will be chosen from the tyres intended to equip a two-wheeled vehicle, a passenger vehicle, or else a "heavy-duty" vehicle (that is to say, underground train, bus, off-road vehicles, heavy road transport vehicles, such as lorries, tractors or trailers), or else aircraft, construction equipment, heavy agricultural vehicles or handling vehicles.

DETAILED DESCRIPTION OF THE INVENTION

I—Constituents of the Composition

The rubber compositions according to the invention are based on at least one elastomer, a reinforcing filler, a crosslinking system and an optionally hydrogenated hydrocarbon-based resin, predominantly composed of units selected from the group consisting of cyclopentadiene, dicyclopentadiene, methylcyclopentadiene and mixtures thereof, said hydrocarbon-based resin having an average molecular weight Mz of less than 2000 g/mol and a glass transition temperature Tg, expressed in ° C., such that:

$Tg \geq 80 - 2*(\% \ HA)$ wherein % HA represents the content of aromatic protons of said resin, the content of said hydrocarbon-based resin is within a range extending from 15 to 150 phr (parts by weight per hundred parts by weight of elastomer).

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention can be different in the non-crosslinked state and in the crosslinked state.

In the present description, unless expressly indicated otherwise, all the percentages (%) shown are percentages by weight. Furthermore, any range of values denoted by the expression "between a and b" represents the range of values extending from more than a to less than b (that is to say, limits a and b excluded), while any range of values denoted by the expression "from a to b" means the range of values extending from a up to b (that is to say, including the strict limits a and b).

When reference is made to a "predominant" compound, this is understood to mean, within the meaning of the present invention, that this compound is predominant among the compounds of the same type in the composition, that is to say that it is the one which represents the greatest amount by weight among the compounds of the same type. Thus, for example, a predominant polymer is the polymer representing the greatest weight relative to the total weight of the polymers in the composition. In the same way, a "predominant" filler is that representing the greatest weight among the fillers of the composition. By way of example, in a system comprising just one polymer, the latter is predominant within the meaning of the present invention and, in a system comprising two polymers, the predominant polymer represents more than half of the weight of the polymers. On the contrary, a "minor" compound is a compound which does not represent the greatest fraction by weight among the compounds of the same type.

For the purposes of the present invention, when reference is made to a "predominant" unit (or monomer) within the same compound (or polymer), this is intended to mean that this unit (or monomer) is predominant among the units (or monomers) forming the compound (or polymer), that is to say it is the one which represents the greatest fraction by weight among the units (or monomers) forming the compound (or polymer). Thus, for example, a resin predominantly composed of cyclopentadiene units is a resin in which the cyclopentadiene units represent the greatest amount by weight among all the units composing said resin. Similarly, a resin predominantly composed of units selected from the group consisting of cyclopentadiene, dicyclopentadiene, methylcyclopentadiene and the mixtures thereof is a resin in which the sum of the units selected from the group consisting of cyclopentadiene, dicyclopentadiene, methylcyclopentadiene and the mixtures thereof represents the greatest number by weight among all the units composing said resin. In other words, a "predominant" monomer is a monomer which represents the greatest fraction by weight in the polymer. On the contrary, a "minor" monomer is a monomer which does not represent the greatest molar fraction in the polymer.

In the present application, when reference is made to a ratio of the amounts of a compound A and of a compound B, or a ratio between the content of a compound A and the content of a compound B, this is always a ratio in the mathematical sense of the amount of compound A over the amount of compound B.

I-1. Elastomer

The elastomer may be selected from the group consisting of diene elastomers and mixtures thereof.

It is recalled here that elastomer (or "rubber", the two terms being regarded as synonymous) of the "diene" type should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

Diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not fall under the preceding definition and may especially be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Given these definitions, diene elastomer capable of being used in the compositions according to the invention is understood more particularly to mean:

(a) any homopolymer obtained by polymerization of a conjugated diene monomer having from 4 to 12 carbon atoms;

(b) any copolymer obtained by copolymerization of one or more conjugated dienes with one another or with one or more vinylaromatic compounds having from 8 to 20 carbon atoms;

(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, especially, 1,4-hexadiene, ethylidene norbornene or dicyclopentadiene;

(d) a copolymer of isobutene and of isoprene (butyl rubber) and also the halogenated versions, in particular chlorinated or brominated versions, of this type of copolymer.

Although it applies to any type of diene elastomer, those skilled in the art of tyres will understand that the present invention is preferably employed with essentially unsaturated diene elastomers, in particular of the above type (a) or (b).

The following are especially suitable as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers may contain between 99% and 20% by weight of diene units and between 1% and 80% by weight of vinylaromatic units. The elastomers can have any microstructure, which depends on the polymerization conditions used, especially on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. "Function" here is preferentially understood to mean a chemical group which interacts with the reinforcing filler of the composition.

To summarize, the diene elastomer of the composition is preferentially selected from the group of highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferentially selected from the group consisting of butadiene/styrene (SBR) copolymers.

Thus, the invention preferably relates to compositions in which the elastomer said diene elastomer is selected from the group consisting of essentially unsaturated diene elastomers, and especially from the group consisting of polybutadienes, synthetic polyisoprenes, natural rubber, butadiene copolymers, isoprene copolymers and the mixtures of these elastomers.

According to a particularly preferred mode of the invention, the elastomer predominantly comprises an elastomer, preferentially a diene elastomer, having a glass transition temperature Tg of less than −70° C., preferably of between −70° C. and −110° C.

More preferentially, the elastomer predominantly comprises an elastomer having a glass transition temperature Tg of between −80° C. and −110° C., preferably between −90° C. and −110° C.

Preferably, the predominant diene elastomer is selected from the group consisting of polybutadienes, butadiene copolymers and mixtures of these elastomers, and more preferentially from the group consisting of polybutadienes, copolymers of butadiene and styrene, and the mixtures of these elastomers.

According to this embodiment, the predominant, preferentially diene, elastomer having a very low Tg is present in the composition at a content preferentially greater than or equal to 60 phr, more preferentially greater than or equal to 70 phr and more preferentially still greater than or equal to 80 phr. More preferably, the composition comprises 100 phr of elastomer having a very low Tg as defined above.

I-2 Reinforcing Filler

The composition according to the invention comprises a reinforcing filler. Use may be made of any type of reinforcing filler known for its abilities to reinforce a rubber composition which can be used for the manufacture of tyres, for example an organic filler, such as carbon black, a reinforcing inorganic filler, such as silica or alumina, or also a blend of these two types of filler.

All carbon blacks, especially "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of functionalized polyvinyl organic fillers, such as described in applications WO-A-2006/069792, WO-A-2006/069793, WO-A-2008/003434 and WO-A-2008/003435.

The composition can comprise one type of silica or a blend of several silicas. The silica used can be any reinforcing silica known to those skilled in the art, especially any precipitated or fumed silica exhibiting a BET surface area and a CTAB specific surface area both of less than 450 m²/g, preferably from 30 to 400 m²/g. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber, treated precipitated silicas, such as, for example, the silicas "doped" with aluminium described in Application EP-A-0735088, or the silicas with a high specific surface as described in Application WO 03/16837.

The silica preferably has a BET specific surface of between 45 and 400 m²/g, more preferentially of between 60 and 300 m²/g.

These compositions can optionally also comprise, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, fatty acids, polyethers, primary, secondary or tertiary amines, or hydroxylated or hydrolysable polyorganosiloxanes.

Use is made especially of silane polysulfides, referred to as "symmetrical" or "asymmetrical" depending on their specific structure, such as described, for example, in applications WO 03/002648 (or US 2005/016651) and WO 03/002649 (or US 2005/016650).

Suitable in particular, without the definition below being limiting, are silane polysulfides referred to as "symmetrical", corresponding to the following general formula (III):

$$Z\text{-}A\text{-}S_x\text{-}A\text{-}Z, \quad \quad \quad \text{(III)}$$

in which:

x is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$ alkylenes, in particular $C_1$-$C_4$ alkylenes, especially propylene);

Z corresponds to one of the formulae below:

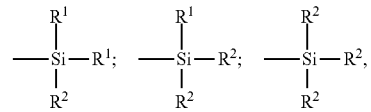

in which:

the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl), the $R^2$ radicals, which are substituted or unsubstituted and identical to or different from one another, represent a $C_1$-$C_{18}$ alkoxy or $C_5$-$C_{18}$ cycloalkoxy group (preferably a group chosen from $C_1$-$C_8$ alkoxys and $C_5$-$C_8$ cycloalkoxys, more preferentially still a group chosen from $C_1$-$C_4$ alkoxys, in particular methoxy and ethoxy).

In the case of a mixture of alkoxysilane polysulfides corresponding to the above formula (III), especially normal commercially available mixtures, the mean value of the "x" indices is a fractional number preferably of between 2 and 5, more preferentially of approximately 4. However, the invention can also advantageously be carried out, for example, with alkoxysilane disulfides (x=2).

Mention will more particularly be made, as examples of silane polysulfides, of bis(($C_1$-$C_4$)alkoxy($C_1$-$C_4$)alkylsilyl ($C_1$-$C_4$)alkyl) polysulfides (especially disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula $[(C_2H_5O)_3Si(CH_2)_3S_2]_2$, or bis(3-triethoxysilylpropyl) disulfide, abbreviated to TESPD, of formula $[(C_2H_5O)_3Si(CH_2)_3S]_2$. Mention will also be made, as preferential examples, of bis(mono($C_1$-$C_4$)alkoxydi($C_1$-$C_4$)alkylsilylpropyl) polysulfides (in particular disulfides, trisulfides or tetrasulfides), more particularly bis(monoethoxydimethylsilylpropyl) tetrasulfide, such as described in Patent Application WO 02/083782 (or US 2004/132880).

Mention will also be made, as coupling agent other than alkoxysilane polysulfide, of bifunctional POSs (polyorganosiloxanes) or else of hydroxysilane polysulfides ($R^2$=OH in the above formula III), such as described in Patent Applications WO 02/30939 (or U.S. Pat. No. 6,774,255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

In the rubber compositions in accordance with the invention, the content of coupling agent is preferentially between 1 and 15 phr, more preferentially between 3 and 14 phr.

Those skilled in the art will understand that, as filler equivalent to silica described in the present section, use might be made of a reinforcing filler of another nature, especially organic, provided that this reinforcing filler is covered with a layer of silica or else comprises functional sites, especially hydroxyl sites, at its surface which require the use of a coupling agent in order to form the bond between the filler and the elastomer.

The physical state in which the reinforcing filler is provided is not important, whether it is in the form of a powder, of micropearls, of granules, of beads or any other appropriate densified form.

For the purposes of the invention, the content of total reinforcing filler (carbon black and/or reinforcing inorganic filler, such as silica) is from 5 to 200 phr, more preferentially from 40 to 160 phr. Below 5 phr of filler the composition might not be sufficiently reinforced, whereas above 200 phr of filler the composition might have poorer performance with regard to rolling resistance.

Use is preferably made of silica as predominant filler, preferably at a content ranging from 40 to 150 phr, more preferentially from 90 to 150 phr; and optionally carbon black. The carbon black, when it is present, is used in a minor amount, preferably at a content within a range extending from 0.1 to 10 phr, more preferentially from 0.5 to 10 phr, especially from 1 to 5 phr.

I-3 Crosslinking System

In the composition of the invention, any type of crosslinking system known to those skilled in the art for rubber compositions may be used.

The crosslinking system is preferably a vulcanization system, that is to say based on sulfur (or on a sulfur-donating agent) and a primary vulcanization accelerator. Various known secondary vulcanization accelerators or vulcanization activators, such as zinc oxide, stearic acid or equivalent compounds, or guanidine derivatives (in particular diphenylguanidine), may be added to this base vulcanization system, being incorporated during the first non-productive phase and/or during the productive phase, as described subsequently.

The sulfur is used at a preferential content of between 0.5 and 10 phr, more preferentially of between 0.5 and 5 phr, in particular between 0.5 and 3 phr.

The vulcanization system of the composition according to the invention may also comprise one or more additional accelerators, for example compounds of the family of the thiurams, zinc dithiocarbamate derivatives, sulfenamides, guanidines or thiophosphates. Use may in particular be made of any compound capable of acting as accelerator of the vulcanization of diene elastomers in the presence of sulfur, especially accelerators of thiazoles type and also their derivatives, accelerators of the thiurams type, and zinc dithiocarbamates. These accelerators are more preferentially selected from the group consisting of 2-mercaptobenzothiazole disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazole-sulfenimide (abbreviated to "TBSI"), zinc dibenzyldithiocarbamate (abbreviated to "ZBEC") and the mixtures of these compounds. Use is preferably made of a primary accelerator of the sulfenamide type.

I-4 Specific Hydrocarbon-Based Resin

The composition according to the invention comprises a specific hydrocarbon-based resin.

This optionally hydrogenated hydrocarbon-based resin is predominantly composed of units selected from the group consisting of cyclopentadiene, dicyclopentadiene, methylcyclopentadiene and mixtures thereof.

Preferably, the hydrocarbon-based resin of use for the purposes of the invention has a content of aromatic protons of less than 50%, preferably within a range extending from 0% to 20%, preferably from 0% to 15%.

According to a preferential embodiment, the hydrocarbon-based resin of use for the purposes of the invention has a content of aromatic protons of less than 5%, preferably within a range extending from 0% to 4%, preferably from 0% to 2%, preferably of 0%.

According to another, also preferential, embodiment, the hydrocarbon-based resin of use for the purposes of the invention has a content of aromatic protons within a range extending from 3% to 15%, preferably from 5% to 10%.

Also preferably, the hydrocarbon-based resin of use for the purposes of the invention has a content of ethylenic protons of less than 0.5%, preferably of less than 0.1%. More preferentially, the resin does not comprise any ethylenic units.

The hydrocarbon-based resin of use for the purposes of the invention has an average molecular weight Mz of less than 2000 g/mol, preferably less than 1500 g/mol.

The hydrocarbon-based resin of use for the purposes of the invention also has a glass transition temperature Tg, expressed in ° C., such that Tg≥80−2*(% HA)—wherein % HA represents the content of aromatic protons of said resin—preferably such that Tg≥85−2*(% HA). The Tg is measured according to ASTM D3418 (1999).

Preferably, the hydrocarbon-based resin of use for the purposes of the invention has a polydispersity index (PI) of less than 1.7, preferably of less than 1.6.

Numerous hydrocarbon-based resins are available commercially. These resins may have characteristics, especially of chemical composition, of Mz, of Tg, of content of aromatic protons or else of PI, which differ depending on the suppliers.

The macrostructure (Mw, Mn, PI and Mz) of the hydrocarbon-based resin is determined by size exclusion chromatography (SEC) on the basis of standards ISO 16014 (Determination of average molecular mass and molecular mass distribution of polymers using size exclusion chromatography), ASTM D5296 (Molecular Weight Averages and molecular weight distribution of polystyrene by High performance size exclusion chromatography), and DIN 55672 (size exclusion chromatography).

For these measurements, the resin sample is dissolved in non-antioxidized tetrahydrofuran up to a concentration of 1.5 g/l. The solution is filtered with a Teflon filter with a porosity of 0.45 μm, using for example a disposable syringe fitted with a filter. A volume of 100 μl is injected through a set of size exclusion chromatography columns. The mobile phase is eluted at a flow rate of 1 ml/min. The columns are thermostatically controlled at 35° C. in an oven. Detection is carried out by a refractometer thermostatically controlled at 35° C. The stationary phase of the columns is based on a polystyrene divinylbenzene gel with controlled porosity. The polymer chains are separated according to the space that they occupy when they are dissolved in the solvent: the larger the volume they occupy, the less the pores of the columns are accessible to them and the shorter their elution time.

A Moore calibration curve connecting the logarithm of the molar mass (log M) with the elution time (te) is produced beforehand with polystyrene standards and modelled using a third degree polynomial: Log (molar mass of polystyrene) =a+b te+c te2+d te3.

For the calibration curve, polystyrene standards with narrow molecular distributions are used (polydispersity index, PI, of less than or equal to 1.1). The range of molar masses of these standards extends from 160 to approximately 70 000 g/mol. These standards may be grouped together in "families" of 4 or 5 standards having a log M increment of approximately 0.55 between each family.

Use may be made of certified (ISO 13885 and DIN 55672) standards kits such as, for example, the kits of vials from PSS (polymer standard service, reference PSS-pskitrll-3), and also an additional standard PS with Wp=162 g/mol (Interchim, reference 178952). These kits are in the form of 3 vials each containing a family of polystyrene standards in suitable amounts:

Black vial: Wp=1220, 4850, 15 500 and 67 500 g/mol.
Blue vial: Wp=376, 3470, 10 400, 46 000 g/mol.
Yellow vial: Wp=266, 1920, 7200, 28 000 g/mol.
PS162: Wp=162 g/mol.

The number-average molar mass (Mn), weight-average molar mass (Mw), the Mz and the polydispersity of the resin analysed are calculated from this calibration curve. This is why reference is made to molar masses relative to a polystyrene calibration.

For the calculation of the average masses and the PI, the limits of integration of the product elution are defined on the chromatogram corresponding to the injection of the sample. The refractometric signal defined between the two limits of integration is "cut" every second. For each of these "elementary cuts", the elution time ti and the area of the signal from the detector Ai are read off.

It is recalled here that: PI=Mw/Mn with Mw being the weight-average molecular weight and Mn being the number-average molecular weight. It is also recalled that the weights Mw, Mn and Mz are average weights calculated according to the following formulae:

$$MZ = \frac{\Sigma Ai * Mi^2}{\Sigma Ai * Mi}$$

$$Mn = \frac{\Sigma Ai}{\Sigma \frac{Ai}{Mi}}$$

$$Mw = \frac{\Sigma Ai * Mi}{\Sigma Ai}$$

in which Ai is the amplitude of the signal from the refractometric detector corresponding to the weight Mi and to the elution time ti.

The equipment used for the SEC measurement is a liquid chromatography system, for example the Waters Alliance 2690 system comprising a pump, a degasser and an injector; a differential refractometer (for example the Waters 2410 refractometer), software for acquiring and processing the data, for example the Waters Empower software, a column oven, for example the Waters "Columns Heater Module" and 4 columns mounted in series in the following order:

| Number | Brand | Range of molar masses (g/mol) | Length (mm) | Internal diameter (mm) | Particle size (μm) | Trade name | References (for information only) |
|---|---|---|---|---|---|---|---|
| Columns 1 and 2 | Polymer Laboratories | 200-400000 | 300 | 7.5 | 5 | MIXED-D | PL1110-6504 |
| Columns 3 and 4 | Polymer Laboratories | 200-30000 | 300 | 7.5 | 3 | MIXED-E | PL1110-6300 |

The content of aromatic protons (% HA) and the content of ethylenic protons (% HE) are measured by $^1$H NMR. This is determined relative to all the signals detected. Thus, the results obtained are expressed as % of area of peak.

The samples are dissolved in deuterated chloroform (CDCl$_3$) at an amount of approximately 10 mg of resin in approximately 1 ml of solvent. The spectra are acquired on a Bruker Avance 500 MHz spectrometer fitted with a Bruker "broad band" BBO z-grad 5 mm probe. The $^1$H NMR experiment uses a 30° single pulse sequence and a repetition time of 5 seconds between each acquisition. 64 accumulations are carried out at ambient temperature. The chemical shifts are calibrated with respect to the protonated impurity of the deuterated chloroform; δ ppm 1H at 7.20 ppm. The $^1$H NMR signals of the aromatic protons are located between 8.5 ppm and 6.2 ppm. The ethylenic protons give rise to signals between 6.2 ppm and 4.5 ppm. Finally, the signals corresponding to aliphatic protons are located between 4.5 ppm and 0 ppm. The areas of each category of protons are related to the sum of these areas to thereby give a distribution in terms of % of area for each category of protons.

The commercially available resins below were analysed using the methods described above in order to determine their characteristics; Table 1 summarizes the results obtained.

TABLE 1

| Resin | Trade reference | Resin manufacturer | Chemical nature | Mz (g/mol) | Tg resin (° C.) | % HA (%) | % HE (%) | PI | 80-2 *(% HA) (° C.) |
|---|---|---|---|---|---|---|---|---|---|
| Resin 1 | E5600 BR | Exxon Mobil | Hydrogenated DCPD-C9 | 1337 | 52 | 10 | 0 | 1.63 | 60 |
| Resin 2 | PR-383 BR | Exxon Mobil | Hydrogenated DCPD-C9 | 1416 | 55 | 10 | 0 | 1.65 | 60 |
| Resin 3 | TP7042 BR | Arizona Chemical | terpene phenolic | 1201 | 93 | 10 | 2 | 1.25 | 60 |
| Resin 4 | ARKON P125 BR | Arakawa | Alicyclic hydrogenated | 2284 | 75 | 3 | 0 | 1.67 | 74 |
| Resin 5 | E5415 BR | Exxon Mobil | hydrogenated DCPD | 1268 | 66 | 0 | 0 | 1.65 | 80 |
| Resin 6 | E5320 BR | Exxon Mobil | hydrogenated DCPD | 1263 | 74 | 0 | 0 | 1.63 | 80 |
| Resin 7 | E5340 BR | Exxon Mobil | hydrogenated DCPD | 1187 | 86 | 0 | 0 | 1.53 | 80 |
| Resin 8 | PR-100 BR | Exxon Mobil | hydrogenated DCPD | 1139 | 88 | 0 | 0 | 1.49 | 80 |
| Resin 9 | E5615 BR | Exxon Mobil | Hydrogenated DCPD-C9 | 1332 | 68 | 10 | 0 | 1.48 | 60 |
| Resin 10 | E5637 BR | Exxon Mobil | Hydrogenated DCPD-C9 | 1459 | 80 | 5 | 0 | 1.51 | 70 |

By analysis of the commercial resins, Table 1 shows that only the resins 7 to 10 meet the criteria of the resin of use for the purposes of the invention.

The resin of use for the purposes of the invention, predominantly composed of units selected from the group consisting of cyclopentadiene, dicyclopentadiene, methylcyclopentadiene and the mixtures thereof, may comprise, in addition to these units and in a minor amount, aliphatic or aromatic units or else units of aliphatic/aromatic type, that is to say based on aliphatic and/or aromatic monomers.

Suitable as aromatic monomers are, for example: styrene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene, indene, or any vinylaromatic monomer resulting from a $C_9$ fraction (or more generally from a $C_8$ to $C_{10}$ fraction). Preferably, the vinylaromatic monomer is styrene or a vinylaromatic monomer resulting from a $C_9$ fraction (or more generally from a $C_8$ to $C_{10}$ fraction).

According to a particularly preferential embodiment, the resin of use for the purposes of the invention is selected from the group consisting of resins of homopolymers of cyclopentadiene, dicyclopentadiene or methylcyclopentadiene and the mixtures thereof, or resins of copolymers consisting of monomers selected from the group consisting of cyclopentadiene, dicyclopentadiene, methylcyclopentadiene and the mixtures thereof, and the mixtures of these copolymeric resins. Likewise, the resin of use for the purposes of the invention may be a mixture of the abovementioned monomeric or copolymeric resins.

According to another embodiment which is also very preferential, the resin of use for the purposes of the invention is selected from the group consisting of resins predominantly composed of units selected from the group consisting of cyclopentadiene, dicyclopentadiene, methylcyclopentadiene and a minor amount of aromatic units or else units of aliphatic/aromatic type, and the mixtures thereof.

The content of resin in the composition according to the invention is within a range extending from 15 phr to 150 phr, preferentially from 25 to 120 phr, more preferentially from 40 to 115 phr, even more preferentially from 50 to 110 phr, better still from 65 to 110 phr. Indeed, below 15 phr of the resin of use for the purposes of the invention, the effect of the resin would be insufficient and the composition could have problems of grip, whereas above 150 phr, the composition could present manufacturing difficulties in terms of readily incorporating all the resin into the composition.

I-5 Other Possible Additives

The rubber compositions in accordance with the invention optionally also comprise all or a portion of the normal additives customarily used in elastomer compositions intended especially for the manufacture of treads, such as, for example, pigments, protective agents, such as antiozone waxes, chemical antiozonants or antioxidants, plasticizing agents other than those described above, anti-fatigue agents, reinforcing resins, or methylene acceptors (for example novolac phenolic resin) or donors (for example HMT or H3M).

The composition according to the invention may also comprise a plasticizing system. This plasticizing system may be composed of a hydrocarbon-based resin with a Tg of greater than 20° C., in addition to the specific hydrocarbon-based resin described above, and/or a plasticizing oil.

Of course, the compositions in accordance with the invention can be used alone or in a blend (i.e., in a mixture) with any other rubber composition which can be used in the manufacture of tyres.

It is obvious that the invention relates to the rubber compositions described above both in the "uncured" or non-crosslinked state (i.e., before curing) and in the "cured" or crosslinked, or else vulcanized, state (i.e., after crosslinking or vulcanization).

II—Preparation of the Rubber Compositions

The compositions are manufactured in appropriate mixers, using two successive phases of preparation which are well known to those skilled in the art: a first phase of thermomechanical working or kneading (sometimes referred to as "non-productive" phase) at high temperature, up to a maximum temperature of between 110° C. and 200° C., preferably between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system is incorporated; such phases have been described, for example, in applications EP-A-0 501 227, EP-A-0 735 088, EP-A-0 810 258, WO00/05300 or WO00/05301.

The first (non-productive) phase is preferentially carried out in several thermomechanical stages. During a first step, the elastomers, the reinforcing fillers and the hydrocarbon-based resin (and optionally the coupling agents and/or other ingredients, with the exception of the crosslinking system) are introduced into an appropriate mixer, such as a customary internal mixer, at a temperature between 20° C. and 100° C. and preferably between 25° C. and 100° C. After a few minutes, preferentially from 0.5 to 2 min, and a rise in the temperature to 90° C. or to 100° C., the other ingredients (that is to say, those which remain, if not all were put in at the start) are added all at once or in portions, with the exception of the crosslinking system, during a mixing ranging from 20 seconds to a few minutes. The total duration of the kneading, in this non-productive phase, is preferably between 2 and 10 minutes at a temperature of less than or equal to 180° C. and preferentially of less than or equal to 170° C.

After cooling the mixture thus obtained, the crosslinking system is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or slab, in particular for laboratory characterization, or else extruded, in order to form, for example, a rubber profiled element used in the manufacture of semi-finished products for tyres. These products may then be used for the manufacture of tyres, according to techniques known to those skilled in the art, with the advantage of the invention, namely good tack of the layers on one another before curing of the tyre.

The crosslinking (or curing) is carried out in a known way at a temperature generally of between 130° C. and 200° C., under pressure, for a sufficient time which can vary, for example, between 5 and 90 min, as a function in particular of the curing temperature, of the crosslinking system adopted, of the kinetics of crosslinking of the composition under consideration or else of the size of the tyre.

The examples which follow illustrate the invention without, however, limiting it.

III—Exemplary Embodiments of the Invention

III-1 Preparation of the Examples

In the examples which follow, the rubber compositions were produced as described above.

III-2 Characterization of the Examples

In the examples, the rubber compositions are characterized, before and/or after curing, as indicated below.

Dynamic Properties (after Curing):

The dynamic properties $G^*$ and $\tan(\delta)max$ are measured on a viscosity analyser (Metravib V A4000) according to Standard ASTM D 5992-96. The response of a sample of vulcanized composition (cylindrical test specimen with a thickness of 4 mm and a diameter of 10 mm), subjected to a simple alternating sinusoidal shear stress, at a frequency of 10 Hz, during a temperature sweep from −80° C. to +100° C. with a temperature gradient of +1.5° C./min, under a maximum stress of 0.7 MPa, is recorded. The value of the tangent of the loss angle ($\tan(\delta)$) is then noted at 0° C. and 60° C.

The lower the value for the $\tan(\delta)$ at 60° C., the lower will be the hysteresis of the composition and thus the lower will be the rolling resistance. The results are expressed in terms of performance base 100, that is to say that the value 100 is arbitrarily assigned to the best control, in order to subsequently compare the $\tan(\delta)$ at 60° C. (that is to say the hysteresis—and hence the rolling resistance) of the various solutions tested. The value in base 100 is calculated according to the operation: (value of $\tan(\delta)$ at 60° C. of the control/value of $\tan(\delta)$ at 60° C. of the sample)*100. In this way, a lower value represents a reduction in the hysteresis performance (that is to say an increase in the hysteresis), while a higher value represents a better hysteresis performance (that is to say a lower hysteresis).

For the value of $\tan(\delta)$ 0° C., the higher the value, the more the composition will enable good wet grip. The results are expressed in terms of performance base 100, that is to say that the value 100 is arbitrarily assigned to the best control, in order to calculate and subsequently compare the $\tan(\delta)$ at 0° C. of the various solutions tested. The value in base 100 is calculated according to the operation: (value of $\tan(\delta)$ at 0° C. of the sample/value of $\tan(\delta)$ at 60° C. of the control)*100. In this way, a lower value represents a reduction in the grip performance (that is to say a lower $\tan(\delta)$ value at 0° C.), while a higher value represents a better grip performance (that is to say a higher $\tan(\delta)$ value at 0° C.).

III-3 Examples

The compositions are manufactured with introduction of all of the constituents onto an internal mixer, with the exception of the vulcanization system. The vulcanization agents (sulfur and accelerator) are introduced onto an external mixer at low temperature (the constituent rolls of the mixer being at around 30° C.).

The object of the examples presented in Table 2 is to compare the different rubber properties of control compositions (T0 to T7) to the properties of compositions in accordance with the invention (C1 to C4). The properties measured, before and after curing, are presented in Table 3.

TABLE 2

|  | T0 | T1 | T2 | T3 | T4 | T5 | T6 | C1 | C2 | C3 | C4 |
|---|---|---|---|---|---|---|---|---|---|---|---|
| BR (1) | 100 | 100 | 100 | 100 | 100 | 100 | 100 | 100 | 100 | 100 | 100 |
| Carbon black (2) | 4 | 4 | 4 | 4 | 4 | 4 | 4 | 4 | 4 | 4 | 4 |
| Silica (3) | 130 | 130 | 130 | 130 | 130 | 130 | 130 | 130 | 130 | 130 | 130 |
| Resin 1 (4) | — | 95 | — | — | — | — | — | — | — | — | — |
| Resin 2 (4) | — | — | 95 | — | — | — | — | — | — | — | — |
| Resin 3 (4) | — | — | — | 95 | — | — | — | — | — | — | — |
| Resin 4 (4) | — | — | — | — | 95 | — | — | — | — | — | — |
| Resin 5 (4) | — | — | — | — | — | 95 | — | — | — | — | — |
| Resin 6 (4) | — | — | — | — | — | — | 95 | — | — | — | — |
| Resin 7 (4) | — | — | — | — | — | — | — | 95 | — | — | — |
| Resin 8 (4) | — | — | — | — | — | — | — | — | 95 | — | — |
| Resin 9 (4) | — | — | — | — | — | — | — | — | — | 95 | — |
| Resin 10 (4) | — | — | — | — | — | — | — | — | — | — | 95 |
| Antioxidant (5) | 6 | 6 | 6 | 6 | 6 | 6 | 6 | 6 | 6 | 6 | 6 |
| Coupling agent (6) | 13 | 13 | 13 | 13 | 13 | 13 | 13 | 13 | 13 | 13 | 13 |
| DPG (7) | 2.5 | 2.5 | 2.5 | 2.5 | 2.5 | 2.5 | 2.5 | 2.5 | 2.5 | 2.5 | 2.5 |
| Stearic acid (8) | 3 | 3 | 3 | 3 | 3 | 3 | 3 | 3 | 3 | 3 | 3 |
| ZnO (9) | 0.9 | 0.9 | 0.9 | 0.9 | 0.9 | 0.9 | 0.9 | 0.9 | 0.9 | 0.9 | 0.9 |
| Accelerator (10) | 2.3 | 2.3 | 2.3 | 2.3 | 2.3 | 2.3 | 2.3 | 2.3 | 2.3 | 2.3 | 2.3 |
| Soluble sulfur | 0.7 | 0.7 | 0.7 | 0.7 | 0.7 | 0.7 | 0.7 | 0.7 | 0.7 | 0.7 | 0.7 |

(1) BR: polybutadiene, CB24 from Lanxess; 96% of 1,4-cis-; Tg = −107° C.
(2) Carbon black, ASTM N234 grade
(3) Silica, Zeosil 1165 MP from Solvay, HDS type
(4) Resins 1 to 10: cf Table 1 above
(5) N-(1,3-Dimethylbutyl)-N'-phenyl-p-phenylenediamine (Santoflex 6-PPD) from Flexsys and 2,2,4-trimethyl-1,2-dihydroquinoline (TMQ)
(6) Coupling agent: Si69 from Evonik - Degussa
(7) Diphenylguanidine, Perkacit DPG from Flexsys
(8) Stearin, Pristerene 4931 from Uniqema
(9) Zinc oxide, industrial grade - Umicore
(10) N-Cyclohexyl-2-benzothiazolesulfenamide (Santocure CBS from Flexsys)

TABLE 3

|  | T0 | T1 | T2 | T3 | T4 | T5 | T6 | C1 | C2 | C3 | C4 |
|---|---|---|---|---|---|---|---|---|---|---|---|
| Grip performance (base 100) | 100 | 148 | 149 | 130 | 162 | 151 | 152 | 164 | 161 | 169 | 179 |
| Hysteresis performance at 60° C. (base 100) | 100 | 97 | 98 | 43 | 52 | 93 | 90 | 88 | 89 | 93 | 94 |
| Mean of the performance properties | 100 | 123 | 123 | 87 | 107 | 122 | 121 | 126 | 125 | 131 | 137 |

Relative to the control compositions, it is noted that the composition T0, which is not in accordance with the invention and which does not comprise plasticizing resin, has a grip (measured by the tan(δ) value at 0° C.) which is low and which requires improvement. The grip of this composition therefore serves as base 100 for comparing the performance of the other compositions. It is noted that all the compositions comprising a resin make it possible to improve this performance. On the other hand, only the compositions C1 to C4 and T4 enable more than 60% improvement in grip. On the other hand, and contrary to the compositions in accordance with the invention (C1 to C4), the composition T4 has highly degraded hysteresis performance which cannot be appropriate for the invention. Thus, it is noted that only the compositions C1 to C4 (the mean of the performance properties of which is improved by 25% or more relative to T0) have good hysteresis performance (measured by the tan(δ) value at 60° C.), and grip improved by more than 60%.

The invention claimed is:

1. A rubber composition based on at least one elastomer, a reinforcing filler, a crosslinking system and an optionally hydrogenated hydrocarbon-based resin, predominantly composed of units selected from the group consisting of cyclopentadiene, dicyclopentadiene, methylcyclopentadiene and mixtures thereof, said hydrocarbon-based resin having an average molecular weight Mz of less than 2000 g/mol and a glass transition temperature Tg, expressed in ° C., such that Tg≥80−2*(% HA), wherein % HA represents the content of aromatic protons of said hydrocarbon-based resin, wherein the content of said hydrocarbon-based resin is within a range extending from 95 to 110 phr, and wherein the reinforcing filler is a combination of silica and carbon black and a content of the reinforcing filler is present within a range extending from 40 to 160 phr, the silica being present at a content within a range extending from 40 to 150 phr.

2. The rubber composition according to claim 1, wherein said hydrocarbon-based resin has an Mz of less than 1500 g/mol.

3. The rubber composition according to claim 1, wherein said hydrocarbon-based resin has a glass transition temperature Tg, expressed in ° C., such that Tg≥85−2*(% HA).

4. The rubber composition according to claim 1, wherein said hydrocarbon-based resin has a polydispersity index PI of less than 1.7.

5. The rubber composition according to claim 4, wherein said hydrocarbon-based resin has a polydispersity index PI of less than 1.6.

6. The rubber composition according claim 1, wherein said hydrocarbon-based resin has a content of aromatic protons of less than 50%.

7. The rubber composition according to claim 6, wherein said hydrocarbon-based resin has a content of aromatic protons within a range extending from 0% to 20%.

8. The rubber composition according to claim 7, wherein said hydrocarbon-based resin has a content of aromatic protons within a range extending from 0% to 15%.

9. The rubber composition according to claim 8, wherein said hydrocarbon-based resin has a content of aromatic protons of less than 5%.

10. The rubber composition according to claim 9, wherein said hydrocarbon-based resin has a content of aromatic protons within a range extending from 0% to 4%.

11. The rubber composition according to claim 10, wherein said hydrocarbon-based resin has a content of aromatic protons within a range extending from 0% to 2%.

12. The rubber composition according to claim 11, wherein said hydrocarbon-based resin has a content of aromatic protons of 0%.

13. The rubber composition according to claim 7, wherein said hydrocarbon-based resin has a content of aromatic protons within a range extending from 3% to 15%.

14. The rubber composition according to claim 13, wherein said hydrocarbon-based resin has a content of aromatic protons within a range extending from 5% to 10%.

15. The rubber composition according to claim 1, wherein said hydrocarbon-based resin has a content of ethylenic protons of less than 0.5%.

16. The rubber composition according to claim 15, wherein said hydrocarbon-based resin has a content of ethylenic protons of less than 0.1%.

17. The rubber composition according to claim 15, wherein the resin does not comprise any ethylenic units.

18. The rubber composition according to claim 1, wherein the at least one elastomer predominantly comprises an elastomer having a glass transition temperature Tg of less than −70° C.

19. The rubber composition according to claim 18, wherein the at least one elastomer predominantly comprises an elastomer having a glass transition temperature Tg of between −70° C. and −110° C.

20. The rubber composition according to claim 18, wherein the at least one elastomer predominantly comprises an elastomer having a glass transition temperature Tg of between −80° C. and −110° C.

21. The rubber composition according to claim 20, wherein the at least one elastomer predominantly comprises an elastomer having a glass transition temperature Tg of between −90° C. and −110° C.

22. The rubber composition according to claim 1, wherein the at least one elastomer predominantly comprises an essentially unsaturated diene elastomer.

23. The rubber composition according to claim 22, wherein the essentially unsaturated diene elastomer is selected from the group consisting of polybutadienes, butadiene copolymers, and mixtures thereof.

24. The rubber composition according to claim 23, wherein the essentially unsaturated diene elastomer is selected from the group consisting of polybutadienes, copolymers of butadiene and styrene, and mixtures thereof.

25. The rubber composition according to claim 1, wherein a predominant reinforcing filler is silica.

26. The rubber composition according to claim 1, wherein a minority amount of carbon black is present.

27. The rubber composition according to claim 26, wherein the carbon black is present at a content within a range extending from 0.1 to 10 phr.

28. A tire comprising a rubber composition according to claim 1.

29. The tire according to claim 28, wherein the rubber composition is present in all or part of the tread of the tire.

* * * * *